Jan. 20, 1970
R. J. NOWAKOWSKI
3,491,285
POTENTIAL REGULATOR CIRCUIT
Filed May 1, 1967
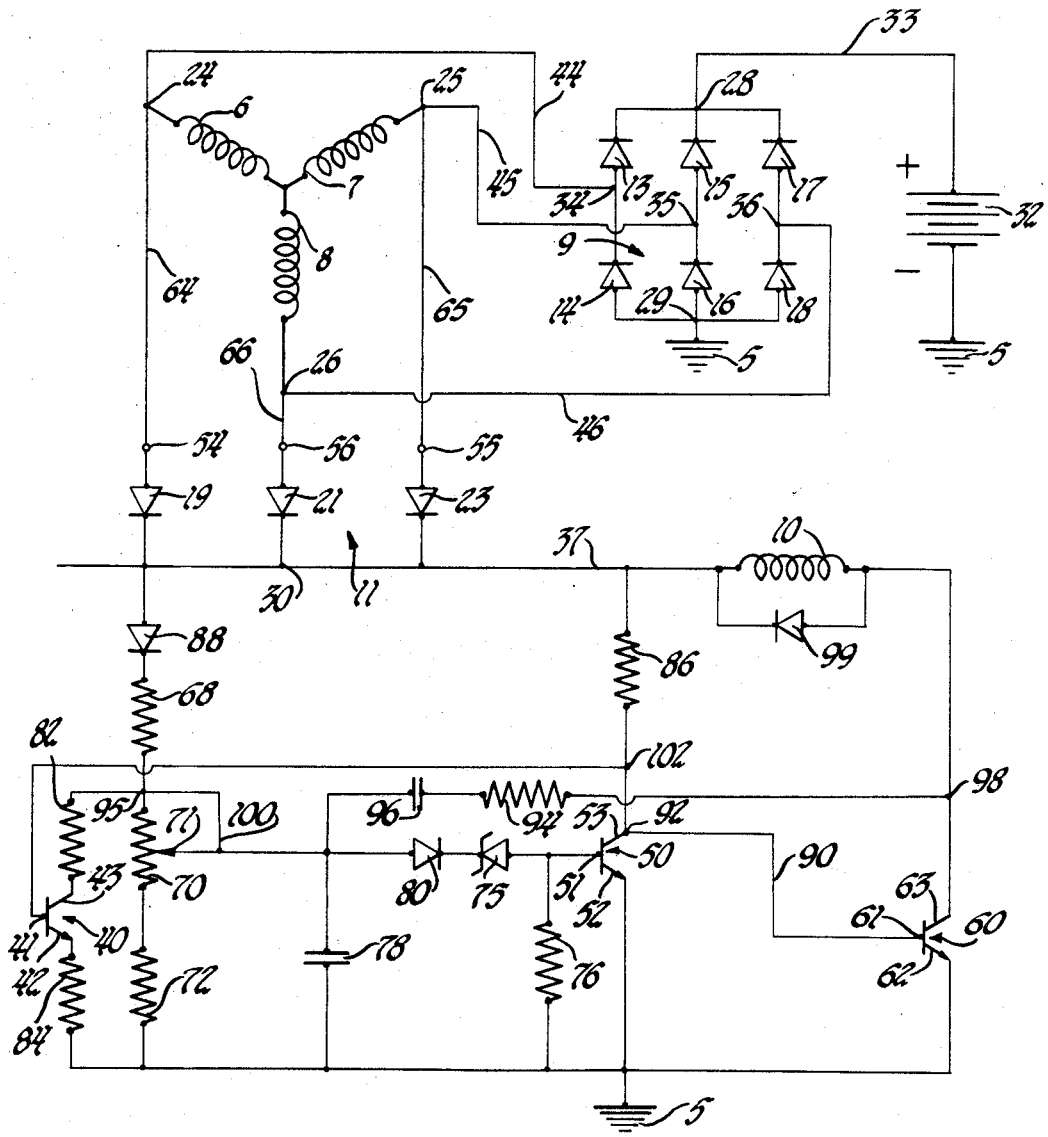
INVENTOR.
Robert J. Nowakowski
BY
Richard G. Stahl
ATTORNEY United States Patent Office 3,491,285
Patented Jan. 20, 1970

3,491,285
POTENTIAL REGULATOR CIRCUIT
Robert J. Nowakowski, Indianapolis, Ind., assignor to General Motors Corporation, Detroit, Mich., a corporation of Delaware
Filed May 1, 1967, Ser. No. 634,955
Int. Cl. G05f 1/40, 1/44
U.S. Cl. 323—22      3 Claims

ABSTRACT OF THE DISCLOSURE

To provide a substantially constant electrical generating system output potential between maximum and minimum values of electrical load, the collector and emitter electrodes of a control transistor are connected in parallel with at least a portion of the potential sensing circuitry across which the input electrodes of the field switching semiconductor driver is connected and the base electrode thereof is connected to the electrode of the field switching semi-conductor driver to which the base electrode of the field switching semi-conductor is connected. With these connections, the degree of conduction of the control transistor and, therefore, the resistance value of that portion of the potential sensing circuitry across which the input electrodes of the field switching semi-conductor driver is connected is varied in response to the average potential across the field switching semi-conductor driver in such a manner that with light electrical loads, the system output potential tends to decrease and with heavy electrical loads, the system output potential tends to increase.

The present invention relates to potential regulator circuits and, more specifically, to a potential regulator circuit having a potential sensitive circuit arrangement which provides for substantially constant output potential between minimum and maximum electrical loads.

With electrical generating systems, particularly those in which a rotating dynamoelectric machine generates the electrical potential, there is a tendency for the output potential to increase with light electrical loads and to fall off or decrease with increased electrical loads, particularly as the load approaches the maximum. A substantially flat output potential versus load characteristic is usually the most desirable.

It is, therefore, an object of this invention to provide an improved potential regulator circuit.

It is another object of this invention to provide an improved potential regulator circuit having a novel potential sensitive circuit arrangement which provides a substantially constant output potential for all values of electrical load between minimum and maximum.

In accordance with this invention, a potential regulator circuit is provided wherein the resistance value of the circuit across which the field switching semiconductor driver is connected is varied in response to average potential magnitude appearing across the field switching semiconductor driver.

For a better understanding of the present invention, together with additional objects, advantages and features thereof, reference is made to the following description and accompanying single figure drawing which sets forth an embodiment of the potential regulator circuit of this invention in schematic form.

For purposes of illustrating the features of the novel regulating circuit of this invention and without intention or inference of a limitation thereto, the operation thereof will be described in combination with a three-phase, field coil type alternator and the associated rectifier circuitry. The alternating current output coils of a three-phase alternator are schematically illustrated in the figure as Y-connected stator coils 6, 7 and 8, which also may be connected in a delta configuration. A magnetic field produced by current flow through the alternator field coil 10 moves relative to stator coils 6, 7 and 8 and generates a three-phase potential therein in a manner well known in the art.

The three-phase alternating current potential generated in stator coils 6, 7 and 8 is converted to a rectified direct current system potential by a pair of three-phase bridge type full wave rectifier circuits. Diodes 14, 16 and 18 comprise the negative polarity bank of diodes which is common to both rectifier circuits. Diodes 13, 15 and 17 comprise the positive polarity bank of diodes of rectifier circuit 9 and diodes 19, 21 and 23 comprise the positive polarity bank of diodes of rectifier circuit 11.

The alternating current potentials generated in stator coils 6, 7 and 8 appear across the alternator alternating current output circuitry which may be respective terminals 24, 25 and 26 or any other electrical device or arrangement which provides for an electrical connection to external circuitry. Stator coils 6, 7 and 8 are connected to respective alternating current input circuit terminals or junctions 34, 35 and 36 of rectifier circuit 9 through respective leads 44, 45 and 46 and to alternating current input circuit terminals or junctions 54, 55 and 56 of rectifier circuit 11 through respective leads 64, 65 and 66.

The three-phase alternating current potentials generated in stator coils 6, 7 and 8 are full wave rectified by rectifier circuits 9 and 11 and appear as system potential across positive polarity direct current output circuit junction 28 and negative polarity direct current output circuit junction 29 of rectifier circuit 9 and positive polarity direct current output circuit junction 30 and negative polarity direct current output circuit junction 29 of rectifier circuit 11. Positive polarity junction 28 may be connected to a positive polarity line 33, positive polarity junction 30 may be connected to a positive polarity line 37 and the negative polarity junction 29, common to both rectifier circuits, may be connected to point of reference or ground potential 5 which, since it is the same point electrically throughout the system, has been represented by the accepted schematic symbol and referenced by the same numeral throughout the figure. With this arrangement, the same system potential magnitude appears across both positive polarity lines 33 and 37 and point of reference or ground potential 5 at no load. Under load conditions the potential magnitude across these lines and ground will be substantially the same, differing only to the extent that the drop across the respective positive polarity diodes differs.

The system potential may be employed to charge a conventional storage battery 32 connected across positive polarity line 33 and point of reference or ground potential 5 and poled as shown.

The unique potential sensitive circuit arrangement of this invention includes a voltage divider circuit, a semiconductor device having two current carrying electrodes and a control electrode and circuitry responsive to average potential magnitude across the semi-conductor device for varying the resistance value of the circuit across which the control electrode and one of the current carrying electrodes of the semi-conductor device is connected.

Referring to the figure, the voltage divider circuit comprises fixed resistor 68, potentiometer 70 having a movable contact 71 and fixed resistor 72. The semi-conductor device may be type NPN driver transistor 50 having two current carrying electrodes, emitter electrode 52 and collector electrode 53, and a control electrode, base electrode 51. The circuitry responsive to average potential magnitude across the semi-conductor device may be a type NPN compensating transistor 40 having a control electrode, base electrode 41, and two current carrying electrodes, emitter electrode 42 and collector electrode 43. Alternate transistor types may also be employed with compatible electrical polarities.

To apply system potential across the voltage divider circuit and the current carrying electrodes of the semi-conductor device in parallel, the parallel combination of the potential divider circuit, resistor 68, potentiometer 70 and resistor 72, and the current carrying electrodes, collector electrode 53 and emitter electrode 52, of type NPN driver transistor 50 is connected across positive polarity line 37 and point of reference or ground potential 5 through temperature compensating diode 88 and load resistor 86, respectively.

To connect the control electrode and one of the current carrying electrodes of the semi-conductor device across a selected point along the voltage divider circuit and a selected one end of the voltage divider circuit, the control or base electrode 51 of driver transistor 50 is connected to movable contact 71 of potentiometer 70 of the voltage divider circuit through a reverse poled Zener diode 75, which provides for system potential magnitude sensing, and a temperature compensating diode 80 and one of the current carrying electrodes thereof, emitter electrode 52, is connected to a selected end of the voltage divider circuit through point of reference or ground potential 5. Therefore, the circuit across which the control electrode and one of the current carrying electrodes of the semi-conductor device are connected includes resistor 72 and that portion of potentiometer 70 as determined by the setting of movable contact 71.

Collector electrode 53 of type NPN driver transistor 50 is connected to the positive polarity direct current output terminal 30 of rectifier circuit 11 through load resistor 86 and positive polarity line 37 and the emitter electrode 52 thereof is connected to the negative polarity output terminal 29 through point of reference or ground potential 5, therefore, this type NPN transistor is forward poled.

In the potential sensitive circuit, resistor 76 is a base bias resistor, capacitor 78 is a filter capacitor and the series combination of resistor 94 and capacitor 96 is a feedback circuit which provides for sharper switching of driver transistor 50.

To vary the resistance value of the circuit across which the control electrode and one of the current carrying electrodes of the semi-conductor switching device is connected, circuitry responsive to average potential magnitude across the semi-conductor device is provided and includes compensating transistor 40, collector resistor 82 and emitter resistor 84. The collector-emitter electrodes of compensating transistor 40 may be connected across junction 95 and point of reference or ground potential 5, as shown. Collector resistor 82 and emitter resistor 84 are selected to be of proper relative values which will provide for Class A operation of compensating transistor 40 while the potential regulator circuit is energized. That is, compensating transistor 40 will conduct between minimum and maximum values with changes of system potential but will not go to cut-off.

Collector electrode 43 of type NPN compensating transistor 40 is connected to the positive polarity direct current output terminal 30 of rectifier circuit 11 through resistor 82, resistor 68 and diode 88, included for purposes of temperature compensation, and the emitter electrode 42 thereof is connected to the negative polarity output terminal 29 through resistor 84 and point of reference or ground potential 5, therefore, this type NPN transistor is forward poled.

To establish and interrupt the field 10 energization circuit, a type NPN field switching transistor 60 is employed. The collector electrode 63 and emitter electrode 62 thereof are connected in series with alternator field winding 10 across positive polarity line 37 and point of reference or ground potential 5. The base electrode 61 of field switching transistor 60 is connected to the collector electrode 53 of driver transistor 50 through lead 90. Diode 99 is a field discharge diode.

Collector electrode 63 and emitter electrode 62 of type NPN field switching transistor 60 are connected respectively to positive polarity direct current output terminal 30, through field winding 10, and to negative polarity direct current output terminal 29, through point of reference or ground potential 5, therefore, this device is forward poled.

The maximum system potential, as determined by the external electrical circuitry or components with which the potential generating system is to be employed is selected. Zener diode 75 is selected to have an inverse breakdown potential rating substantially equal to that proportion of the system potential which appears thereacross, as determined by the setting of movable contact 71 of potentiometer 70, with the system potential across the potential divider circuit being substantially equal to the selected predetermined maximum.

The regulating circuit arrangement of this invention regulates the system potential of the generating system and compensates for changes in output potential with changes of electrical load between minimum and maximum values in a manner now to be explained.

With system potential magnitudes substantially equal to or less than the selected maximum, Zener diode 75 remains non-conductive to interrupt the base-emitter electrode circuit of driver transistor 50. Therefore, driver transistor 50 does not conduct with system potential magnitudes equal to or less than the selected maximum. With driver transistor 50 in the non-conductive state, the potential appearing at junction 92, relative to point of reference or ground potential 5, is of a positive polarity and of a magnitude substantially equal to system potential. A positive polarity potential upon junction 92 produces base drive current flow through the base-emitter electrode junction of type NPN field switching transistor 60 to render this device conductive. With field switching transistor 60 conducting, an energizing circuit for alternator field coil 10 is established, a condition which tends to increase system potential magnitude.

With system potential magnitudes greater than the selected maximum, Zener diode 75 breaks down and conducts in a reverse direction to complete a circuit for the flow of base drive current through the base-emitter electrode junction of type NPN driver transistor 50 thereby triggering this device conductive. With driver transistor 50 conducting, the potential of junction 92 is substantially ground, therefore, the base and emitter electrodes of field switching transistor 60 are at substantially the same potential, a condition which renders this device non-conductive. With field switching transistor 60 not conducting, the energizing circuit for alternator field coil 10 is interrupted, a condition which tends to reduce system potential magnitude.

From this description, it is apparent that, with normal operation, driver transistor 50 and field switching transistor 60 conduct alternately.

Base-electrode 41 of compensating transistor 40 is connected to the collector electrode 53 of driver transistor 50 at junction 102. With this connection, the potential applied to base electrode 41 of compensating transistor 40 is equal to the collector-emitter drop across driver transistor 50 during the periods this device is conducting and is equal to the base-emitter drop across field switching transistor 60 during periods this device is conducting. Therefore, the potential applied to the base electrode 41 of compensating transistor 40 is equal to the average potential magnitude appearing across driver transistor 50.

For proper operation of the novel circuit of this invention, driver transistor 50 is selected to have a collector-emitter potential drop during conduction of a value less than the base-emitter potential drop of field switching transistor 60 during conduction. Therefore, with driver transistor 50 conducting, the potential applied to the base electrode 41 of compensating transistor 40 is of a value less than the potential applied thereto while field switching transistor 60 is conducting.

With low electrical loads and, consequently, a tendency for system potential to increase, the period of time during which driver transistor 50 is conductive is greater than that during which field switching transistor 60 is conductive. Therefore, the average potential appearing across driver transistor 50 decreases in magnitude. The reduced average potential magnitude appearing across driver transistor 50, applied to the base electrode 41 of type NPN compensating transistor 40, results in reduced base drive current and, consequently, a decrease of conduction through this Class A operating device. As conduction through compensating transistor 40 decreases, the resistance of the circuit across which the base-emitter electrodes of driver transistor 50 are connected increases, consequently, the proportion of system potential appearing thereacross also increases. Therefore, Zener diode 75 will break down and conduct in a reverse direction with a lower system potential to render driver transistor 50 conductive and, consequently, field switching transistor 60 non-conductive in a manner previously explained. The switching of field switching transistor 60 non-conductive at lower system potentials with low electrical loads, of course, tends to maintain the system potential at a lower magnitude under these load conditions.

With high electrical loads and, consequently, a tendency for system potential to fall off or reduce, the period of time during which field switching transistor 60 is conductive is greater than that during which driver transistor 50 is conductive. Therefore, the average potential appearing across driver transistor 50 increases in magnitude. The increased average potential magnitude appearing across driver transistor 50, applied to the base electrode 41 of type NPN compensating transistor 40, results in increased base drive current and, consequently, an increase of conduction through this Class A operating device. As conduction through compensating transistor 40 increases, the resistance of the circuit across which the base-emitter electrodes of driver transistor 50 are connected decreases, consequently, the proportion of system potential appearing thereacross also decreases. Therefore, Zener diode 75 will break down and conduct in a reverse direction with a higher system potential to render driver transistor 50 conductive and, consequently, field switching transistor 60 non-conductive in a manner previously explained. The switching of field switching transistor 60 non-conductive at higher system potentials with high electrical loads, of course, tends to maintain the system potential at a higher magnitude under these load conditions.

From this description, it is apparent that compensating transistor 40 is rendered conductive in response to average potential magnitude across driver transistor 50 in a manner to tend to lower system potential with low electrical loads and to increase system potential with high electrical loads thereby providing a substantially flat system potential vs. load characteristic.

As a safety feature to prevent abnormal system potential in the event the circuit between movable contact 71 of potentiometer 70 and the potenitometer resistor should become open, a lead 100 is connected between junction 95 and movable contact 71. With this connection, even though the potentiometer circuit should open, the base electrode 51 of driver transistor 50 would be positively biased. Therefore, as the system potential increases slightly above the selected maximum, driver transistor 50 would conduct to extinguish field switching transistor 60 thereby preventing a further increase of system potential.

This invention has been described in reference to the full wave rectification of a three-phase alternating current potential. It is to be specifically understood that the novel circuit of this invention is equally applicable for use with generating systems employing full or one-half wave rectification of more or less alternating current phases and is not to be construed to be limited to the specific embodiment set forth in the figure.

What is claimed is:

1. In a potential regulator circuit for regulating the system potential of an electrical generating system, the potential sensitive circuit arrangement comprising, a voltage divider circuit, a transistor having collector and emitter electrodes and a base electrode, means for connecting said base electrode and said emitter electrode across a selected point along said voltage divider circuit and a selected one end of said voltage divider circuit, means for applying system potential across said voltage divider circuit and said collector-emitter electrodes of said transistor in parallel, and means responsive to average potential magnitude across said transistor for varying the resistance value of that portion of said voltage divider circuit across which said base electrode and said emitter electrode of said transistor are connected.

2. The potential sensitive circuit arrangement as defined in claim 1 wherein said means responsive to average potential magnitude across said transistor comprises a second transistor having collector and emitter electrodes and a base electrode, means including circuit elements which will conduct direct current for connecting said collector-emitter electrodes of said second transistor across that portion of said voltage divider circuit across which said base electrode and said emitter electrode of said transistor are connected and means for connecting said base electrode of said second transistor device to the said collector electrode of said transistor.

3. In a potential regulator circuit for regulating the system potential of an electrical generating system, the potential sensitive circuit arrangement comprising, a voltage divider circuit including at least one potentiometer having a movable contact, a first transistor having collector and emitter electrodes and a base electrode, means for connecting said base electrode and said emitter electrode of said first transistor across said movable contact of said potentiometer and a selected one end of said voltage divider circuit, a second transistor having collector and emitter electrodes and a base electrode, means including circuit elements which will conduct direct current for connecting said collector-emitter electrodes of said second transistor across that portion of said voltage divider circuit across which said base electrode and said emitter electrode of said first transistor are connected, means for connecting said base electrode of said second transistor to the said collector electrode of said first transistor, means for applying system potential across said voltage divider circuit and said collector-emitter electrodes of said first transistor in parallel and a direct electrical connection between said movable contact of said potentiometer device and a selected one end of said potentiometer device.

References Cited

UNITED STATES PATENTS

| | | | |
|---|---|---|---|
| 3,098,966 | 7/1963 | Raver | 322—73 |
| 3,201,681 | 8/1965 | Wilgen et al. | 322—25 X |
| 3,209,235 | 9/1965 | Roof | 322—73 X |
| 3,215,935 | 11/1965 | Mead et al. | |

LEE T. HIX, Primary Examiner

A. D. PELLINEN, Assistant Examiner

U.S. Cl. X.R.

322—28, 73; 323—38